United States Patent [19]

Wagner et al.

[11] Patent Number: 4,684,703
[45] Date of Patent: Aug. 4, 1987

[54] POLYMERIZATION CATALYST FOR ETHYLENE HOMOPOLYMERIZATION

[75] Inventors: Burkhard E. Wagner, Highland Park; Frederick J. Karol; George L. Goeke, both of Belle Mead, all of N.J.; Robert J. Jorgensen, Dunbar, W. Va.; Nils Friis, Macungie, Pa.

[73] Assignee: Union Carbide Corporation, Danbury, Conn.

[21] Appl. No.: 471,068

[22] Filed: Mar. 7, 1983

Related U.S. Application Data

[63] Continuation of Ser. No. 14,412, Feb. 27, 1979, abandoned, which is a continuation-in-part of Ser. No. 892,037, Mar. 31, 1978, abandoned.

[51] Int. Cl.$^4$ .............. C08F 4/02; C08F 2/34
[52] U.S. Cl. ...................... 526/88; 526/125; 526/351; 526/901
[58] Field of Search ............... 526/88, 125

[56] References Cited

U.S. PATENT DOCUMENTS

| | | | |
|---|---|---|---|
| 3,152,088 | 10/1964 | Sandri et al. | 526/124 |
| 3,168,484 | 2/1965 | Engel et al. | 526/124 |
| 3,288,720 | 11/1966 | Moretti et al. | 526/124 |
| 3,594,330 | 7/1971 | Delbouille et al. | 526/124 |
| 3,642,746 | 2/1972 | Kashiwa et al. | 526/125 |
| 3,642,748 | 2/1972 | Iwasaki et al. | 526/127 |
| 3,644,318 | 2/1972 | Diedrich et al. | 526/140 |
| 3,663,450 | 5/1972 | Cozewith et al. | 526/115 |
| 3,676,414 | 7/1972 | Diedrich et al. | 526/125 |
| 3,790,550 | 2/1974 | Miller | 526/901 |
| 3,864,278 | 2/1975 | La Heij et al. | 526/142 |
| 3,865,749 | 2/1975 | Tornvuist et al. | 526/122 |
| 3,925,338 | 12/1975 | Ort | 526/86 |
| 4,113,933 | 9/1978 | Schweier et al. | 526/124 |
| 4,124,532 | 11/1978 | Giannini et al. | 252/429 H |

FOREIGN PATENT DOCUMENTS

| | | |
|---|---|---|
| 669693 | 9/1963 | Canada . |
| 1011045 | 5/1977 | Canada . |
| 1011047 | 5/1977 | Canada . |
| 1502567 | 3/1978 | United Kingdom . |
| 1502883 | 3/1978 | United Kingdom . |

*Primary Examiner*—Edward J. Smith
*Attorney, Agent, or Firm*—J. S. Piscitello

[57] ABSTRACT

A catalyst formed from selected organo aluminum compounds and a precursor composition of the formula $$Mg_mTi_1(OR)_nX_p[ED]_q$$

wherein
ED is a selected electron donor compound
m is $\geq 0.5$ to $\leq 56$
n is 0 or 1
p is $\geq 6$ to $\leq 116$
q is $\geq 2$ to $\leq 85$
R is a $C_1$ to $C_{14}$, aliphatic or aromatic hydrocarbon radical, or COR' wherein R' is a $C_1$ to $C_{14}$ aliphatic or aromatic hydrocarbon radical, and
X is selected from the group consisting of Cl, Br, I, or mixtures thereof, which catalyst is in particulate form and diluted with an inert carrier material; a process for preparing such catalyst; a process for using said catalyst to readily prepare ethylene homopolymer having a density of about $\geq 0.958$ to $\leq 0.972$ and a melt flow ratio of $\geq 22$ to $\leq 32$ in a low pressure gas phase process at a productivity of $\geq 50,000$ pounds of polymer per pound of Ti. Novel polymers and molded articles are prepared.

3 Claims, 1 Drawing Figure

U.S. Patent     Aug. 4, 1987     4,684,703
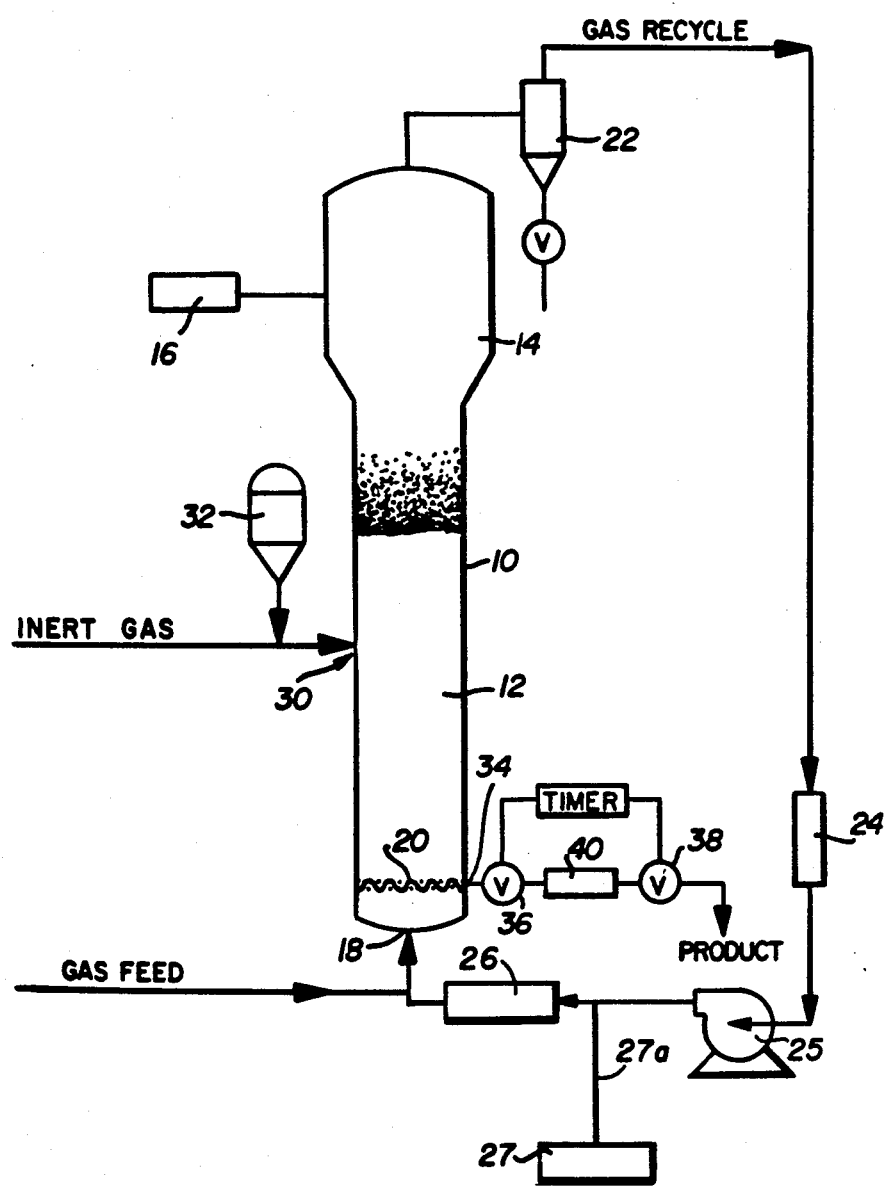

POLYMERIZATION CATALYST FOR ETHYLENE HOMOPOLYMERIZATION

This application is a continuation of Ser. No. 014,412, filed Feb. 27, 1979 which was a continuation-in-part of Ser. No. 892,037, filed Mar. 31, 1978, both now abandoned.

BACKGROUND OF THE INVENTION

The invention relates to the catalytic homopolymerization of ethylene with high activity Mg and Ti containing complex catalysts in a low pressure gas phase process to produce polymers having a density of $\geq 0.958$ to $\leq 0.972$ and a melt flow ratio $\geq 22$ to $\leq 32$.

DESCRIPTION OF THE PRIOR ART

Ethylene homopolymers having a density of $\geq 0.96$ and a melt index in the range of about 5 to 50 are useful for injection molding purposes requiring excellent impact strength properties provided that they have a relatively narrow molecular weight distribution. Ethylene polymers having a density of $\geq 0.96$ and a melt index of $\leq 20$ can be made with the catalysts and low pressure gas phase processes described in U.S. Pat. Nos. 3,023,203; 4,003,712 and 3,709,853. The polymers made with the supported chromium oxide, silylchromate and chromocene catalysts, respectively, of these patents, however, have a relatively broad molecular weight distribution as evidenced by melt flow ratio values of $\geq 35$. The polymers of these patents, therefore, have relatively limited use for injection molding applications requiring excellent impact strength properties. It is desirable therefore, to provide catalysts which would enable one to readily prepare, in a gas phase process, ethylene polymers which would have a relatively narrow molecular weight distribution.

To be commercially useful in a gas phase process, such as the fluid bed process of U.S. Pat. Nos. 3,709,853; 4,003,712 and 4,011,382, and Canadian Pat. No. 91,798 and Belgian Pat. No. 839,380, the catalyst employed must be a high activity catalyst, that is, it must have a level of productivity of $\geq 50,000$, preferably $\geq 100,000$, pounds of polymer per pound of primary metal in the catalyst. This is so because such gas phase processes usually do not employ any catalyst residue removing procedures. Thus, the catalyst residue in the polymer must be so small that it can be left in the polymer without causing any undue problems in the hands of the resin fabricator and/or ultimate consumer. Where a high activity catalyst is successfully used in such fluid bed processes the heavy metal content of the resin is of the order of $\leq 20$ parts per million (ppm) of primary metal at a productivity level of $\geq 50,000$ and of the order of $\leq 10$ ppm at a productivity level of $\geq 100,000$, and of the order of $\leq 3$ ppm at a productivity level of $\geq 300,000$. Low catalyst residue contents are also important where the catalyst is made with chlorine containing materials such as the titanium, magnesium and/or aluminum chlorides used in some so-called Ziegler or Ziegler-Natta catalysts. High residual chlorine values in a molding resin will cause pitting and corrosion on the metal surfaces of the molding devices. Cl residues of the order of $\geq 200$ ppm are not commercially useful.

U.S. Pat. No. 3,989,881 discloses the use of a high activity catalyst for the manufacture, under slurry polymerization conditions, of ethylene polymers having a relatively narrow molecular weight distribution (Mw/Mn) of about 2.7 to 3.1. Attempts were made to use catalysts similar to those described in U.S. Pat. No. 3,989,881 for the purpose of making polyethylene of narrow molecular weight distribution by polymerizing ethylene alone or with propylene in the gas phase in a fluid bed process using apparatus and conditions similar to those employed in U.S. Pat. No. 4,011,382 and Belgian Pat. No. 839,380. These attempts were not successful. In order to avoid the use of the solvents in the slurried catalyst systems of U.S. Pat. No. 3,989,881, the Ti/Mg containing components were dried. However, the dried material, a viscous, gummy, pyrophoric composition, could not be readily fed to the reactor because it was not in a free flowing form. Even when blended with silica to improve its free-flowing properties and then added to the reactor the results were commercially unacceptable. The productivity of the catalyst was poor, or the catalyst was pyrophoric and difficult to handle or the polymer product was produced in the form of needle-shaped products which were difficult to fluidize and which exhibited very poor flow properties.

U.S. Pat. No. 4,124,532 discloses the polymerization of ethylene and propylene with high activity catalysts. These catalysts comprise complexes which may contain magnesium and titanium. These complexes are prepared by reacting the halide $MX_2$ (where M may be Mg) with a compound $M'Y$ (where $M'$ may be Ti and Y is halogen or an organic radical) in an electron donor compound. These complexes are then isolated by either crystallization, by evaporation of the solvent or by precipitation.

Polymerization is carried out with these catalytic complexes and an alkyl aluminium compound.

However, U.S. Pat. No. 4,124,532 does not disclose any special techniques or methods of preparing the catalyst in order to achieve the desirable results described in the present invention. The use of the catalysts described in U.S. Pat. No. 4,124,532, without these special methods, would not lead to a commercial fluid bed process to produce polyethylenes at commercial rates.

U.S. Pat. No. 3,922,322 and 4,035,560 disclose the use of several Ti and Mg containing catalysts for the manufacture of granular ethylene polymers in a gas phase fluid bed process under a pressure of $<1000$ psi. The use of these catalysts in these processes, however, has significant disadvantages. The catalysts of U.S. Pat. No. 3,922,322 provide polymers having a very high catalyst residue content, i.e., about 100 ppm of Ti and greater than about 300 ppm Cl, accoridng to the working example of this patent. Further, as disclosed in the working example of U.S. Pat. No. 3,922,322, the catalyst is used in the form of a prepolymer, and very high volumes of the catalyst composition must be fed to the reactor relative to the volume of polymer made in the reactor. The preparation and use of this catalyst thus requires the use of relatively large sized equipment for the manufacture, storage and transporting of the catalyst.

The catalysts of U.S. Pat. No. 4,035,560 also apparently provide polymers having high catalyst residues, and the catalysts compositions are apparently pyrophoric because of the types and amounts of reducing agents employed in such catalysts.

SUMMARY OF THE INVENTION

It has now been unexpectedly found that ethylene homopolymers having a density range of 0.96 to 0.97 and a melt flow ratio of $\geq 22$ to $\leq 32$ and which have a relatively low residual catalyst residue can be produced at relatively high productivities for commercial purposes by a low pressure gas phase process if the ethylene is homopolymerized in the presence of a high activity magnesium-titanium complex catalyst prepared as described below, under specific activation conditions with an organo aluminum compound and an inert carrier material.

An object of the present invention is to provide a process for producing, with relatively high productivities and in a low pressure gas phase process, ethylene homopolymers which have a density of about 0.96 to 0.97, a melt flow ratio of $\geq 22$ to $\leq 32$ and a relatively low residual catalyst content.

A further object of the present invention is to provide a process in which ethylene homopolymers which are useful for a variety of end-use applications may be readily prepared.

A still further object of the present invention is to provide a variety of novel ethylene homopolymers and molded articles made therefrom.

BRIEF DESCRIPTION OF THE DRAWINGS

The drawing shows a gas phase fluid bed reactor system in which the catalyst system of the present invention may be employed.

DESCRIPTION OF THE PREFERRED EMBODIMENT

It has now been found that the desired ethylene homopolymers having a low melt flow ratio can be readily produced with relatively high productivities in a low pressure gas phase fluid bed reaction process if the monomer charge is polymerized under a specific set of operating conditions, as detailed below, and in the presence of a specific high activity catalyst, as is also detailed below.

The Ethylene Homopolymers

The homopolymers have a melt flow ratio of $\geq 22$ to $\leq 32$, and preferably of $\geq 25$ to $\leq 30$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1 and the MFR range of $\geq 25$ to $\leq 30$ corresponds to a Mw/Mn range of about 2.8 to 3.6.

The homopolymers have a density of about $\geq 0.958$ to $\leq 0.972$ and preferably of about $\geq 0.961$ to $\leq 0.968$.

The melt index of a hompolymer is a reflection of its molecular weight. Polymers having a relatively high molecular weight, have a relatively low melt index. Ultra-high molecular weight ethylene polymers have a high load (HLMI) melt index of about 0.0 and very high molecular weight polymers have a high load melt index (HLMI) of about 0.0 to about 1.0. Such high molecular weight polymers are difficult, if not impossible, to mold in conventional injection molding equipment. The polymers made in the process of the present invention, on the other hand, can be readily molded, in such equipment. They have a standard or normal load melt index of $\geq 0.0$ to about 50, and preferably of about 0.5 to 35, and a high load melt index (HLMI) of about 11 to about 950. The melt index of the homopolymers which are made in the process of the present invention is a function of a combination of the polymerization temperature of the reaction and the hydrogen/monomer ratio in the reaction system. Thus, the melt index is raised by increasing the polymerization temperature and/or by increasing the hydrogen/monomer ratio.

The homopolymers of the present invention have an unsaturated group content of $\leq 1$, and usually $\geq 0.1$ to $\leq 0.3$, C=C/1000 carbon atoms, and a cyclohexane extractables content of less than about 3, and preferably less than about 2, weight percent.

The homopolymers of the present invention have a residual catalyst content, in terms of parts per million of titanium metal, of the order of $>0$ to $\leq 20$ parts per million, (ppm) at a productivity level of $\geq 50,000$, and of the order of $>0$ to $\leq 10$ ppm at a productivity level of $\geq 100,000$ and of the order of $>0$ to $\leq 3$ parts per million at a productivity level of $\geq 300,000$. In terms of Cl,Br or I residues, the copolymers of the present invention have a Cl, Br or I residue content which depends upon the Cl, Br or I content of the precursor. From the Ti to Cl, Br, or I ratio in the initial precursor, it is possible to calculate Cl, Br, or I residues from knowledge of the productivity level based on titanuim residue only. For many of the copolymers of the present invention made only with Cl containing components of the catalyst system (Cl/Ti=7), one can calculate a Cl residue content of $>0$ to $\leq 140$ ppm at a productivity of $\geq 50,000$ a Cl content of $>0$ to $\leq 70$ ppm at a productivity of $\geq 100,000$ and a Cl content of $>0$ to $\leq 21$ ppm at a productivity of $\geq 300,000$. The homopolymers are readily produced in the process of the present invention at productivities of up to about 300,000.

The homopolymers of the present invention are granular materials which have an average particle size of the order of about 0.005 to about 0.06 inches, and preferably of about 0.02 to about 0.04 inches, in diameter. The particle size is important for the purposes of readily fluidizing the polymer particles in the fluid bed reactor, as described below. The homopolymers of the present invention have bulk densities of about 18 to 32, and preferably, 25 to 32 pounds per cubic foot.

High Activity Catalyst

The compounds used to form the high activity catalyst used in the present invention comprise at least one titanium compound, at least one magnesium compound, at least one electron donor compound, at least one activator compound and at least one inert carrier material, as defined below.

The titanium compound has the structure $$Ti(OR)_a X_b$$

wherein

R is a $C_1$ to $C_{14}$ aliphatic or aromatic hydrocarbon radical, or COR' where R' is a $C_1$ to $C_{14}$ aliphatic or aromatic hydrocarbon radical, X is selected from the group consisting of Cl, Br, I, or mixtures thereof, a is 0 or 1, b is 2 to 4 inclusive and a+b=3 or 4.

The titanium compounds can be used individually or in combinations thereof, and would include $TiCl_3$, $TiCl_4$, $Ti(OC_6H_5)Cl_3$, $Ti(OCOCH_3)Cl_3$ and $Ti(OCOC_6H_5)Cl_3$.

The magnesium compound has the structure $$MgX_2$$

Wherein X is selected from the group consisting of Cl, Br, I, or mixtures thereof. Such magnesium compounds can be used individually or in combinations thereof and would include $MgCl_2$, $MgBr_2$ and $MgI_2$. Anhydrous MgCl$_2$ is the particularly preferred magnesium compound.

About 0.5 to 56, and preferably about 1 to 10, mols of the magnesium compound are used per mol of the titanium compound in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are partially or completely soluble. The electron donor compounds are known, as such, or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of C$_1$ to C$_4$ saturated aliphatic carboxylic acids; alkyl esters of C$_7$ to C$_8$ aromatic carboxylic acids; C$_2$ to C$_8$, and preferably C$_3$ to C$_4$, aliphatic ethers; C$_3$ to C$_4$ cyclic ethers, and preferably C$_4$ cyclic mono- or di-ether; C$_3$ to C$_6$, and preferably C$_3$ to C$_4$ aliphatic ketones, The most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure $$Al(R'')_c X'_d H_e$$

wherein X' is Cl or OR''', R'' and R''' are the same or different and are C$_1$ to C$_{14}$ saturated hydrocarbon radicals, d is 0 to 1.5, e is 1 or 0 and c+d+e=3.

Such activator compounds can be used individually or in combinations thereof and would include Al(C$_2$H$_5$)$_3$, Al(C$_2$H$_5$)$_2$Cl, Al(i-C$_4$H$_9$)$_3$, Al$_2$(C$_2$H$_5$)$_3$Cl$_3$, Al(i-C$_4$H$_9$)$_2$H, Al(C$_6$H$_{13}$)$_3$, Al(C$_8$H$_{17}$)$_3$, Al(C$_2$H$_5$)$_2$H and Al(C$_2$H$_5$)$_2$(OC$_2$H$_5$).

About 10 to 400, and preferably about 10 to 100, mols of the activator compound are used per mol of the titanium compound in activating the catalysts employed in the present invention.

The carrier materials are solid, particulate materials which are inert to the other components of the catalyst composition, and to the other active components of the reaction system. These carrier materials would include inorganic materials such as oxides of silicon and aluminum and molecular sieves, and organic materials such as olefin polymers such as polyethylene. The carrier materials are used in the form of dry powders having an average particle size of about 10 to 250, and preferably of about 50 to 150 microns. These materials are also preferably porous and have a surface area of ≧3, and preferably of ≧50, square meters per gram. The carrier material should be dry, that is free of absorbed water. Drying of the carrier material is carried out by heating it at a temperature of ≧600° C. Alternatively, the carrier material dried at a temperature of ≧200° C. may be treated with about 1 to 8 weight percent of one or more of the aluminum alkylcompounds described above. This modification of the support by the aluminum alkyl compounds provides the catalyst composition with increased activity and also improves polymer particle morphology of the resulting ethylene polymers.

Catalyst Preparation

The catalyst used in the present invention is prepared by first preparing a precursor composition from the titanium compound, the magnesium compound, and the electron donor compound, as described below, and by then treating the precursor composition with the carrier material and the activator compound in one or more steps as described below.

The precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and, in some instances by refluxing, these two compounds in the electron donor compound. When the titanium compound and the magnesium compound are dissolved, the precursor composition is isolated by crystallization or by precipitation with a C$_5$ to C$_8$ aliphatic or aromatic hydrocarbon such as hexane, isopentane or benzene.

The crystallized or precipitated precursor composition is isolated in the form of fine, free flowing particles having an average particle size of about 10 to 100 microns and a bulk density of about 18 to 33 pounds per cubic foot. Particle sizes of ≦100 μ are preferred for use in a fluid bed process. The particle size of the isolated precursor composition can be controlled by the rate of crystallization or precipitation.

When thus made, as disclosed above, the precursor composition has the formula $$Mg_m Ti_1 (OR)_n X_p [ED]_q$$

wherein

ED is the electron donor compound, m is ≧0.5 to ≦56, and preferably ≧1.5 to ≦5, n is 0 or 1, p is ≧6 to ≦116, and preferably ≧6 to ≦14, q is ≧2 to ≦85, and preferably ≧4 to ≦11, R is a C$_1$ to C$_{14}$ aliphatic or aromatic hydrocarbon radical, or COR' wherein R' is a C$_1$ to C$_{14}$ aliphatic or aromatic hydrocarbon radical and, X is selected from the group consisting of Cl, Br, I, or mixtures thereof.

The subscript for the element titanium (Ti) is the arabic numeral one.

The polymerization activity of the completely activated catalyst is so high, in the process of the present invention, that a dilution of the precursor composition with the carrier material is necessary in order to effectively control the reaction rate. The dilution of the precursor composition can be accomplished before the precursor composition is partially or completely activated, as disclosed below, or concurrent with such activation. The dilution of the precursor composition is accomplished by mechanically mixing or blending about 0.033 to 1, and preferably about 0.1 to 0.33, parts of the precursor composition with one part by weight of the carrier material.

In order to be used in the process of the present invention, the precursor composition must be fully or completely activated, that is, it must be treated with sufficient activator compound to transform the Ti atoms in the precursor composition to an active state. It has been found, however, that the manner of activating the catalyst is very critical in order to obtain an active material even when an inert carrier is present. Attempts to activate the catalyst by a process similar to that of U.S. Pat. No. 3,989,881, for example, wherein the total amount of reducing agent theoretically needed to fully activate the catalyst was added to the precursor composition in a hydrocarbon slurry, followed by drying of the slurry at temperatures of $\geq 20$ to $\leq 80°$ C. to remove the solvent therefrom to facilitate the use of the catalyst in a gas phase process, produced a product which was not sufficiently active in the gas phase fluid bed process otherwise described below for commerical purposes.

It has been found that, in order to prepare a useful catalyst it is necessary to conduct the activation in such a way that at least, the final activation stage must be conducted in the absence of solvent so as to avoid the need for drying the fully active catalyst to remove the solvent therefrom. Two procedures have been developed to accomplish this result. In one procedure, the precursor composition is completely activated, outside the reactor, in the absence of solvent, by dry blending the precursor composition with the activator compound. In this dry blending procedure the activator compound is preferably used while absorbed on a carrier material. This procedure had a disadvantage, however, in that the resulting dry, fully activated catalyst is pyrophoric where it contains >10 weight percent of the activator compound.

In the second, and preferred, of such catalyst activation procedures, the precursor composition is partially activated outside the polymerization reactor with activator compound in a hydrocarbon slurry, the hydrocarbon solvent is removed by drying and the partially activated precursor composition is fed to the polymerization reactor where the activation is completed with additional activator compound which can be the same or a different compound.

Thus, in the dry blending catalyst making procedure the solid particulate precursor composition is added to and evenly blended with solid particles of porous carried material wherein the activator compound is absorbed. The activator compound is absorbed on the carrier material, from a hydrocarbon solvent solution of the activator compound, so as to provide a loading of about 10 to 50 weight percent of activator compound on 90 to 50 weight percent of carrier material. The amounts of the precursor composition, activator compound and carrier material that are employed are such as to provide the desired Al/Ti molar ratios and to provide a final composition having a weight ratio of precursor composition to carrier material of less than about 0.50, and preferably of less than about 0.33. This amount of carrier material thus provides the necessary dilution therewith of the activated catalyst so as to provide the desired control of the polymerization activity of the catalyst in the reactor. Where the final compositions contain about >10 weight percent of the activator compound, they will be pyrophoric. During the dry blending operation, which may be conducted at ambient (25° C.) or lower temperatures, the dry mixture is well agitated to avoid any heat build-up during the ensuing activation reaction which is exothermic, initially. The resulting catalyst is thus completely activated and can be fed to, and used as such in, the polymerization reactor. It is a free-flowing particulate material.

In the second, and preferred catalyst activation procedure, the activation is conducted in at least two stages. In the first stage the solid particulate precursor composition, diluted with carrier material, is reacted with and partially activated by enough activator compound so as to provide a partially activated precursor composition which has an activator compound/Ti molar ratio of about 1 to 10:1 and preferably of about 3 to 6:1. This partial activation reaction is preferably carried out in a hydrocarbon solvent slurry followed by drying of the resulting mixture, to remove the solvent, at temperatures between 20 to 80, and preferably of 50 to 70, °C. In this partial activation procedure the activator compound may be used while absorbed on the carrier material used to dilute the activator compound. The resulting product is a free-flowing solid particulate material which can be readily fed to the polymerization reactor. The partially activated precursor composition, however, is, at best, weakly active, as a polymerization catalyst in the process of the present invention. In order to render the partially activated precursor composition active for ethylene poynerization purposes, additional activator compound must also be added to the polymerization reactor to complete, in the reactor, the activation of the precursor composition. The additional activator compound and the partially activated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The activator conpound may also be added to the reactor in solid form, by being absorbed on a carrier material. The carrier material usually contains 10 to 50 weight percent of the activator for this purpose. The additional activator compound is added to the reactor in such amounts as to provide, in the reactor, with the amounts of activator compound and titanium compound fed with the partially activated precursor composition, a total Al//ti molar ratio of about 10 to 400 and preferably of about 15 to 60. The additional amounts of activator compound added to the reactor, react with and complete the activation of, the titanium compound in the reactor.

In a continuous gas phase process, such as the partially or completely activated precursor composition are continuously fed to the reactor, with discrete portions of any additional activator compound needed to complete the activation of the partially activated precursor composition, during the continuing polymerization process in order to replace active catalyst sites that are expended during the course of the reaction.

The Polymerization Reaction

The polymerization reaction is conducted by contacting a stream of ethylene, in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction.

A fluidized bed reaction system which can be used in the practice of the process of the present invention is illustrated in FIG. 1. With reference thereto, the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possible active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. The elements of the plate may all be stationary, or the plate may be of the mobile type disclosed in U.S. Pat. No. 2,298,792. Whatever its design, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hydrogen per mole of the ethylene in the gas stream.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt index values of the homopolymers that are produced. About 0 to 50, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent material, such as silica, of the types described above, in amounts of about 10 to 50 weight percent. These compositions tend to be pyrophoric. The zinc compound may be added alone or with any additional portions of the activator compound that are to be added to the reactor from a feeder, not shown, which would feed the compound to the hottest portion of the gas recycle system, such as adjacent to feeder 27 disclosed herein.

Any gas inert to the catalyst and reactants can also be present in the gas stream. The activator compound is preferably added to the reaction system at the hottest portion of the recycle gas stream. Addition into the recycle line downstream from the heat exchanger is thus preferred, as from dispenser 27 thru line 27A.

It is essential to operate the fluid bed reactor at a temperature below the sintering temperature of the polymer particles. To insure that sintering will not occur, operating temperatures below the sintering temperature are desired. For the production of ethylene homopolymers in the process of the present invention an operating temperature of about 30° to 115° C. is preferred, and a temperature of about 90° to 105° C. is preferably used to prepare products having a density of about 0.961 to 0.968.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated precursor composition is injected into the bed at a rate equal to its consumption at a point 30 which is above the distribution plate 20. Injecting the catalyst at a point above the distribution plate is an important feature of this invention. Since the catalysts used in the practice of the invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst such as nitrogen or argon is used to carry the partially or completely reduced precursor composition, and any additional activator compound that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accomodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system of this invention appears to yield a fluid bed product having an average particle size between about 0.005 to about 0.06 inches are preferably about 0.02 to about 0.04 inches wherein catalyst residue is unusually low.

The feed stream of gaseous monomer, with or without inert gaseous diluents, is fed into the reactor at a space time yield of about 2 to 10 pounds/hour/cubic foot of bed volume.

The term virgin resin or polymer, as used herein, means polymer, in granular form, as it is recovered from the polymerization reactor.

The following Examples are designed to illustrate the process of the present invention and are not intended as a limitation upon the scope thereof.

The properties of the polymers produced in the Examples were determined by the following test methods:

Density: A plaque is made and conditioned for one hour at 120° C. to approach equilibrium crystallinity and is then quickly cooled to room temperature. Measurement for density is then made in a density gradient column.

Melt Index (MI): ASTM D-1238 - Condition E - Measured at 190° C. - reported as grams per 10 minutes.

Flow Rate (HLMI): ASTM D-1238 - Condition F - Measured at 10 times the weight used in the melt index test above.

$$\text{Melt Flow Ratio } (MFR) = \frac{\text{Flow Rate}}{\text{Melt Index}}$$

productivity: a sample of the resin product is ashed, and the weight % of ash is determined; since the ash is essentially composed of the catalyst, the productivity is thus the pounds of polymer produced per pound of total catalyst consumed. The amount of Ti, Mg and Cl in the ash are determined by elemental analysis.

cyclohexane extractables: a sample of resin is extracted with boiling (at atmospheric pressure) cyclohexane for $\geq 18$ hours.

bulk density: The resin is poured via $\frac{3}{8}''$ diameter funnel into a 100 ml graduated cylinder to 100 ml line without shaking the cylinder, and weighed by difference.

Molecular Weight Distribution ($\overline{M}w/\overline{M}n$): Gel Permeation Chromatography Styrogel Packing: (Pore Size Sequence is $10^7$, $10^6$, $10^5$, $10^4$, 60 Å) Solvent is Ortho-dichloro benzene at 135° C. Detection: Infra red at 3.45μ.

Unsaturation: Infrared Spectrophotomer (Perkin Elmer Model 21). Pressings made from the resin which are 25 mils in thickness are used as test specimens. Absorbance is measured at 10.35μ for trans vinylene unsaturation, 11.0μ for terminal vinyl unsaturation and 11.25μ for pendant vinylidene unsaturation. The absorbance per mil or thickness of the pressing is directly proportional to the product of unsaturation concentration and absorptivity. Absorptivities are taken from the literature values of R. J. de Kock, et al, J. Polymer Science, Part B, 2, 339(1964).

EXAMPLES

I. Preparation of Precursor Composition

In a 5 liter flask equipped with a mechanical stirrer, 16.0 g (0.168 Mol) of anhydrous $MgCl_2$ was mixed with 850 ml of pure tetrahydrofuran under nitrogen. The mixture was stirred at room temperature (~25° C.) while 13.05 g (0.069 Mol) of $TiCl_4$ was added dropwise. After complete addition, the contents of the flask were heated to reflux for about ½ to 1 hour to dissolve the solids. The system was cooled to room temperature and 3 liters of pure n-hexane was slowly added over a period of ¼ hour. A yellow solid precipitated. The supernatant was decanted and the solids were washed with 3×one liter of n-hexane. The solids were filtered and dried in a rotating evaporating flask at 40°-60° C. to give 55 g of solid precursor composition.

The precursor composition may be analyzed at this point for Mg and Ti content since some of the Mg and/or Ti compound may have been lost during the isolation of the precursor composition. The empirical formulas used herein in reporting these precursor compositions are derived by assuming that the Mg and the Ti still exist in the form of the compounds in which they were first added to the electron donor compound and that all other residual weight in the precursor composition is due to the electron donor compound.

Analysis of the solid showed the following: Mg:6.1%; Ti:4.9%; which corresponds to $TiMg_{2.45}Cl_{8.9}(THF)_{7.0}$. THF means tetrahydrofuran.

II. Activation Procedures

Procedure A.—This procedure relates to a multistep activation of the precursor composition. In this procedure the activation is conducted in such a way that the precursor composition is only partially activated prior to the introduction thereof into the polymerization reactor, and then the remainder of the activation process is completed within such reactor.

The desired weight of dry inert carrier material is charged to a mixing vessel or tank. For the examples described herein the amount of inert carrier is about 500 grams for silica and about 1000 grams for a polyethylene carrier. The inert carrier material is then admixed with sufficient amounts of anhydrous, aliphatic hydrocarbon diluent such as isopentane to provide a slurry system. This usually requires about 4 to 7 ml of diluent per gram of inert carrier. The desired weight of the precursor composition is then charged to the mixing vessel and thoroughly admixed with the slurry composition. The amount of precursor composition used in this procedure for making the catalysts in these examples is about 80 to 135 grams, with such precursor composition having an elemental titanium content of 1±0.1 millimole of Ti per gram of precursor composition.

The desired amount of activator compound needed to partially activate the precursor composition is added to the contents of the mixing vessel so as to partially activate the precursor composition. The amount of activator compound used in this regard provides an Al/Ti ratio in the partially reduced precursor composition of >0 to <10:1 and preferably of 3 to 6:1. The activator compound is added to the mixing tank in the form of a solution which contains about 20 weight percent of the activator compound (triethyl aluminum in these examples) in an inert aliphatic hydrocarbon solvent (hexane in these examples). The activation is accomplished by thoroughly mixing and contacting the activator compound with the precursor composition. All of the operations described above are conducted at room temperature, and at atmospheric pressure, in an inert atmosphere.

The resulting slurry is then dried under a purge of dry inert gas such as nitrogen or argon, at atmospheric pressure at a temperature of ≦60° C. to remove the hydrocarbon diluent. This process usually requires about 3 to 5 hours. The resulting product is in the form of a dry free-flowing particulate material wherein the activated precursor composition is uniformly blended with the inert carrier. The dried product is stored under an inert gas.

Where additional activator compound is fed to the polymerization reactor in this Procedure A for the purposes of completing the activation of the precursor composition, it may be first absorbed on an inert carrier material such as silica or polyethylene, or, most preferably, it may be injected into the reaction zone as a dilute solution in a hydrocarbon solvent such as isopentane.

Where the activator compound is to be absorbed on a silica support, the two materials are mixed in a vessel containing about 4 ml of isopentane per gram of carrier material. The resulting slurry is then dried for about 3 to 5 hours under a purge of nitrogen at atmospheric pressure at a temperature of 65°±10° C. to remove the hydrocarbon diluent.

Where the activator compound is to be injected into the polymerization reaction system as a dilute solution, concentrations of about 5 to 10% by weight are preferred.

Regardless of the method used to introduce the activator compound into the polymerization reactor for the purposes of completing the activation of the precursor composition, it is added at a rate such as to maintain the Al/Ti ratio in the polymerization reactor at a level of ≧10 to 400:1 and preferably of ≧10 to 100:1.

Prior to being used herein, the silicas are dried at ≧200° C. for ≧4 hours.

Procedure B—In this procedure a complete activation of the precursor composition is accomplished by blending the precursor composition with, and thereby contacting it with, the activator compound which is absorbed on an inert carrier material.

The activator compound is absorbed on the inert carrier material by being slurried with the carrier material in an inert hydrocarbon solvent and by then drying the slurry to remove the solvent so as to provide a composition containing about 10 to 50 weight percent of activator compound. Thus, 500 grams of silica which has been previously dehydrated (at 800° C. for 4 hours) is charged to a mixing vessel. The desired amount of activator compound, as a 20 weight percent solution in hydrocarbon solvent, such as hexane, is then added to the mixing vessel and mixed (slurried) with the inert carrier at room temperature and atmospheric pressure.

The solvent is then removed by drying the resulting slurry at 65°±10° C. for about 3 to 5 hours at atmospheric pressure under a flowing stream of dry inert gas such as nitrogen. The dried composition is in the form of free flowing particles having the size of the carrier material.

About 500 grams of the dried silica supported activator compound (50/50 weight percent of silica/activator compound) is then added to a mixing vessel. The desired weight of precursor composition (80–135 grams) is also added to the mixing vessel. The materials are then thoroughly mixed for about 1 to 3 hours at room temperature at atmospheric pressure under a dry inert gas such as nitrogen or argon. The resulting composition is in the form of a physical admixture of dry free-flowing particles having a size of the order of 10 to 150 microns. During the admixing operation the supported activator compound comes into contact with the precursor composition and completely activates it. During the resulting exothermic reaction the temperature of the catalyst composition should not be allowed to exceed 50° C. so as to avoid any significant deactivation of the catalyst. The resulting activated composition has an Al/Ti ratio of about 10 to 50 and may be pyrophoric where it contains >10 weight percent of the activator compound. It is stored under a dry inert gas such as nitrogen or argon prior to being injected into the reactor.

EXAMPLES 1–3

Ethylene was homopolymerized in each of this series of 3 examples with catalyst formed as described above and as activated by Activation Procedure A. The silica diluted precursor composition contained 18.4±1% by weight of precursor composition. In each case the partially activated precursor composition had an Al/Ti mol ratio of 4.52±0.03. The completion of the activation of the precursor composition in the polymerization reactor was accomplished with triethyl aluminum absorbed on silica (50/50 weight percent of the two materials) so as to provide the completely activated catalyst in the reactor with an Al/Ti mol ratio of 30.

Each of the polymerization reactions was continuously conducted for >1 hour after equilibrium was reached and under a pressure of about 300 psig and a gas velocity of 3 to 4 times $G_{mf}$ in a fluid bed reactor system at a space time yield of about 3 to 6 lbs/hr/ft$^3$ of bed space. The reaction system was as described in the drawing above. It has a lower section 10 feet high and 13½ inches in (inner) diameter, and an upper section which was 16 feet high and 23½ inches in (inner) diameter.

Table I below lists the $H_2$/ethylene mol ratio and % by volume of ethylene in the reactor and polymerization temperature used in each of Examples 1–3, as well as various properties of the granular virgin resins made in such examples.

TABLE I

Reaction Conditions and Resin Properties For Example 1 to 3

| Example | 1 | 2 | 3 |
|---|---|---|---|
| Operating Conditions | | | |
| $H_2/C_2$ ratio | 0.201 | 0.411 | 0.418 |
| Temperature, °C. | 90 | 110 | 104 |
| % by volume of $C_2$ in reactor | 74.8 | 53.8 | 58.6 |
| Catalyst Productivity (lbs resin/lb Ti) | 210,000 | 74,000 | 142,000 |
| Resin Properties | | | |
| density | 0.9626 | 0.9708 | 0.9701 |
| melt index | 0.63 | 14.6 | 7.38 |
| melt flow ratio | 29.2 | 27.0 | 27.9 |
| cyclohexane extractables | 0.16 | 0.74 | 0.43 |
| ash, weight % | 0.054 | 0.196 | 0.068 |
| Ti content, ppm | 4.8 | 13.5 | 7.0 |
| Cl content, ppm (estimated) | 32 | 89 | 46 |
| Cl content, ppm (by analysis) | — | 53–62 | 39–45 |
| bulk density, lbs/ft$^3$ | 18.1 | 26.2 | 25.0 |
| average particle size, inches | 0.0368 | 0.0192 | 0.0258 |
| Fines, weight % (<100 mesh) | 7.9 | 20.0 | 5.0 |

EXAMPLES 4 to 16

Ethylene was homopolymerized in each of this series of 13 examples with catalyst formed as described above and as activated by Activation Procedure A. In each case the partially activated precursor composition had an Al/Ti mol ratio of 4.71±0.01. The completion of the activation of the precursor composition in the polymerization reactor was accomplished with triethyl aluminum as a 2.6 or 5 weight % solution in isopentane so as to provide the completely activated catalyst in the reactor with an Al/Ti mol ratio of about 13 to 62.

Each of the reactions was conducted as in Examples 1 to 3. Table II below lists, for Examples 4 to 16, the operating conditions also reported in Table I, as well as the Al/Ti mol ratio maintained in the reactor and the weight percent of precursor composition in the silica diluted silica/precursor composition mixture. Table III below lists, for Examples 4 to 16, various properties of the polymers made in such examples.

Zinc diethyl was added to the reactor as a 2.6 weight % solution in isopentane, to maintain a Zn/Ti ratio of 30 in the reactor in each of Examples 5, 6 and 9. In such examples the activator compound was also added to the reactor as a 2.6 weight % solution in isopentane.

TABLE II

Reaction Conditions For Examples 4 to 16

| Example | Wt, % precursor | Al/Ti ratio in reactor | Temp °C. | Vol % $C_2$ in reactor | $H_2/C_2$ mol ratio | Catalyst Productivity |
|---|---|---|---|---|---|---|
| 4 | 17.7 | 30 | 100 | 62.9 | 0.421 | 333,000 |
| 5 | 17.7 | 30 | 110 | 71.9 | 0.263 | 333,000 |
| 6 | 18.2 | 24.1 | 100 | 69.3 | 0.198 | 200,000 |
| 7 | 18.0 | 12.7 | 110 | 63.0 | 0.226 | 143,000 |
| 8 | 18.8 | 22.1 | 99.9 | 57.2 | 0.405 | 125,000 |
| 9 | 17.0 | 51.0 | 104 | 55.5 | 0.400 | 105,000 |
| 10 | 17.0 | 48.0 | 104 | 54.9 | 0.390 | 91,000 |
| 11 | 17.4 | 62.3 | 104 | 52.5 | 0.393 | 80,000 |
| 12 | 17.2 | 43.7 | 104 | 55.9 | 0.400 | 100,000 |
| 13 | 17.2 | 23.4 | 104 | 54.7 | 0.403 | 83,000 |
| 14 | 17.6 | 38.1 | 104 | 58.6 | 0.399 | 77,000 |
| 15 | 17.5 | 46.9 | 104 | 55.2 | 0.390 | 125,000 |

TABLE II-continued

Reaction Conditions For Examples 4 to 16

| Example | Wt, % precursor | Al/Ti ratio in reactor | Temp °C. | Vol % $C_2$ in reactor | $H_2/C_2$ mol ratio | Catalyst Productivity |
|---|---|---|---|---|---|---|
| 16 | 17.5 | 49.9 | 104 | 57.2 | 0.406 | 105,000 |

TABLE III

Properties of Polymers Made in Examples 4 to 16

| Example | density | MI | MFR | ash wt % | Ti ppm | bulk density | aver. part. size, inches |
|---|---|---|---|---|---|---|---|
| 4  | 0.9693 | 9.0   | 28.4 | 0.073 | 3.0  | 23.7 | 0.0312 |
| 5  | 0.9691 | 7.57  | 28.0 | 0.054 | 3.0  | 23.1 | 0.0306 |
| 6  | 0.9656 | 1.74  | 26.2 | 0.019 | 5.0  | 21.2 | 0.0400 |
| 7  | 0.9635 | 3.08  | 25.1 | 0.074 | 7.0  | 23.5 | 0.0326 |
| 8  | 0.9701 | 9.93  | 27.4 | 0.106 | 8.0  | 21.2 | 0.0313 |
| 9  | 0.9706 | 6.47  | 27.8 | 0.100 | 9.5  | 23.7 | 0.0214 |
| 10 | 0.9701 | 7.33  | 25.6 | 0.090 | 11.0 | 24.3 | 0.0210 |
| 11 | 0.9706 | 8.12  | 27.7 | 0.110 | 12.5 | 21.8 | 0.0226 |
| 12 | 0.9699 | 8.37  | 26.9 | 0.080 | 10.0 | 21.8 | 0.0241 |
| 13 | 0.9708 | 7.28  | 27.7 | 0.125 | 12.0 | 22.4 | 0.0259 |
| 14 | 0.9709 | 9.33  | 27.7 | 0.100 | 13.0 | 23.7 | 0.0243 |
| 15 | 0.9707 | 7.33  | 27.4 | 0.117 | 8    | 16.8 | 0.0179 |
| 16 | 0.9716 | 10.03 | 28.4 | 0.105 | 9.5  | 23.1 | 0.0227 |

What is claimed is:

1. A catalytic process for producing ethylene homopolymer with a Ti containing catalyst at a productivity of $\geq 50,000$ pounds of polymer per pound of Ti under a pressure of $<1000$ psi in a gas phase fluid bed reaction said polymer being produced in granular form and having a density of about $\geq 0.958$ to $\leq 0.972$ and a melt flow ratio of $\geq 22$ to $\leq 32$ which comprises homopolymerizing ethylene at a temperature of about 30° to 115° C. by contacting the monomer charge with, in the presence of about 0 to 2.0 mols of hydrogen per mol of ethylene in a gas phase reaction zone, particles of the catalyst formed by (A) forming a precursor composition of the formula
$Mg_mTi_1(OR)_nX_p[ED]_q$
wherein
R is $C_1$ to $C_{14}$ aliphatic or aromatic hydrocarbon radical, or COR' wherein R' is a $C_1$ to $C_{14}$ aliphatic or aromatic hydrocarbon radical,
X is selected from the group consisting of Cl, Br, I, or mixture thereof,
ED is an electron donor compound,
m is $\geq 0.5$ to $\leq 56$
n is 0 or 1
p is $\geq 6$ to $\leq 116$ and
q is $\geq 2$ to $\leq 85$
by dissolving at least one magnesium compound and at least one titanium compound in at least one electron donor compound so as to thereby form a solution of said precursor composition in said electron donor compound, and recovering said precursor composition from said solution,
said magnesium compound having the structure $MgX_2$,
said titanium compound having the structure $Ti(OR)_aX_b$
wherein a is 0 or 1, b is 2 to 4 inclusive and $a+b=3$ or 4
said electron donor compound being a liquid organic compound in which said magnesium compound and said titanium compound are soluble and which is selected from the group consisting of alkyl esters of aliphatic and aromatic carboxylic acids, aliphatic esters, cyclic esters and aliphatic ketones,
and said magnesium compound, said titanium compound and said electron donor compound being employed in such amounts as to satisfy the values of m, n, p and q, (B) diluting said precursor composition with about 1 to 10 parts by weight, per part by weight of said precursor composition, of at least one inert carrier material, (C) partially activating the precursor composition outside the polymerization zone in a hydrocarbon slurry with $>0$ to $<10$ mols of activator compound per mol of titanium in said precursor composition, said activator compound having the structure $Al(R'')_cX'_dH_e$ wherein X' is Cl or OR''', R'' and R''' are the same or different and are $C_1$ to $C_{14}$ saturated hydrocarbon radicals, d is 0 to 1.5, e is 1 or 0 and $c+d+e=3$, and drying the mixture to remove the hydrocarbon solvent, and (D) completely activating the precursor composition in a fluid bed polymerization zone with $\geq 10$ to about 400 mols of said activator compound in the absence of a solvent for said precursor composition so as to avoid the need for drying the fully active catalyst to remove the solvent therefrom.

2. A process as in claim 1 which is conducted under a mass gas flow rate of about 1.5 to 10 times $G_{mf}$.

3. A process as in claim 2 which is conducted at a productivity of $\geq 100,000$.

* * * * *